United States Patent
Hood et al.

(10) Patent No.: US 9,853,909 B2
(45) Date of Patent: Dec. 26, 2017

(54) METHODS AND APPARATUS FOR TRAFFIC MANAGEMENT IN A COMMUNICATION NETWORK

(71) Applicant: TELEFONAKTIEBOLAGET L M ERICSSON (PUBL), Stockholm (SE)

(72) Inventors: David Hood, Palo Alto, CA (US); Mark Shostak, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 161 days.

(21) Appl. No.: 14/854,602

(22) Filed: Sep. 15, 2015

(65) Prior Publication Data

US 2017/0078218 A1    Mar. 16, 2017

(51) Int. Cl.
| | |
|---|---|
| H04L 12/925 | (2013.01) |
| H04L 12/26 | (2006.01) |
| H04L 12/835 | (2013.01) |
| H04L 12/24 | (2006.01) |
| H04W 74/06 | (2009.01) |

(52) U.S. Cl.
CPC ........ H04L 47/722 (2013.01); H04L 41/0896 (2013.01); H04L 43/10 (2013.01); H04L 47/30 (2013.01); H04W 74/06 (2013.01)

(58) Field of Classification Search
CPC ... H04L 47/722; H04L 41/0896; H04L 43/10; H04L 47/30; H04W 74/06
See application file for complete search history.

(56) References Cited

U.S. PATENT DOCUMENTS

| | | | | |
|---|---|---|---|---|
| 7,710,878 | B1 * | 5/2010 | Kubat | H04L 12/2852 370/237 |
| 9,166,913 | B1 * | 10/2015 | Mandal | H04L 47/10 |
| 9,450,817 | B1 * | 9/2016 | Bahadur | H04L 41/0806 |
| 2002/0027885 | A1 * | 3/2002 | Ben-Ami | H04Q 11/0421 370/254 |
| 2002/0097680 | A1 * | 7/2002 | Liu | H04Q 3/0079 370/238 |
| 2002/0143929 | A1 * | 10/2002 | Maltz | H04L 41/0213 709/224 |

(Continued)

FOREIGN PATENT DOCUMENTS

| | | |
|---|---|---|
| EP | 1 777 894 A2 | 4/2007 |
| WO | 2014063283 A1 | 5/2014 |

*Primary Examiner* — Tejis Daya

(57) ABSTRACT

A method in a communication network is disclosed. The network comprises first and second transport mediums connected in series. Access to the first and second transport mediums is controlled by first and second MACs, respectively. A traffic client of the second MAC receives traffic on the first transport medium for forwarding to the second transport medium. The method comprises receiving from the first MAC information about traffic demands from traffic clients of the first MAC. The method further comprises using the received information, together with information about traffic demands from traffic clients of the second MAC, as input to making a medium access grant decision for the second MAC, wherein the medium access grant decision for the second MAC implements a coordination between traffic access to the first and second transport media. The method also comprises instructing implementation of the medium access grant decision for the second MAC.

27 Claims, 6 Drawing Sheets

(56) References Cited

U.S. PATENT DOCUMENTS

| | | | |
|---|---|---|---|
| 2002/0168940 A1* | 11/2002 | Heijenk | H04W 74/06 455/41.1 |
| 2006/0198337 A1 | 9/2006 | Hoang et al. | |
| 2009/0185511 A1 | 7/2009 | Lee et al. | |
| 2013/0329731 A1* | 12/2013 | Gabriel | H04L 45/74 370/392 |
| 2014/0189074 A1* | 7/2014 | Parker | H04L 63/20 709/220 |
| 2014/0280834 A1* | 9/2014 | Medved | H04L 47/122 709/223 |
| 2015/0052243 A1* | 2/2015 | Lumezanu | H04L 43/04 709/224 |
| 2015/0071636 A1* | 3/2015 | Hu | H04L 47/25 398/52 |
| 2015/0188767 A1* | 7/2015 | Li | H04L 41/12 370/254 |
| 2015/0200859 A1* | 7/2015 | Li | H04L 41/0823 370/235 |

\* cited by examiner

METHODS AND APPARATUS FOR TRAFFIC MANAGEMENT IN A COMMUNICATION NETWORK

TECHNICAL FIELD

The present invention relates to methods for management of traffic in a communication network comprising a first transport medium and a second transport medium connected in series with the first transport medium. The present invention also relates to a computer program product configured, when run on a computer, to carry out methods for management of traffic in a communication network, and to a network entity, Medium Access Controller and system for management of traffic in a communication network.

BACKGROUND

Communication networks may employ direct or shared interconnections between entities or nodes in the network. In a direct interconnection, two entities of arbitrary type are directly coupled to one another via a full-duplex medium such as copper, which provides a full-time transmission path in each of the two possible directions in which signals can flow between the entities. As the interconnecting medium is dedicated to the entities, there is no sharing of the transport resource, or contention for its use. In a shared interconnection, two or more entities of arbitrary type are coupled to one another in a logical point-to-multipoint or point-to-point topology via a shared access medium. Examples of shared access media include IEEE 802.3 "Ethernet", IEEE 802.11 "WiFi", ITU G.984 GPON, LTE. Systems that employ arbitration of shared access media, including CSMA[/CD], GEM TC, DBA, etc., typically do so on the basis of requests and attempts to access a shared medium, as well as information about the medium itself.

If multiple entities attempt to access a shared transport medium, contention builds, and entities are forced to wait for a "turn" to use the medium, or wait until one of their medium access attempts is successful and does not result in a "collision". While the transmission subsystem of the entity is waiting for access to the medium, the subsystem generating the data to be transmitted may continue to produce data and pass it to the transmission subsystem. The transmission subsystem will typically attempt to buffer this data, meaning the data is stored in a temporary memory such as a FIFO, until it can be successfully emitted. Once this buffer memory is exhausted, the transmission subsystem will attempt to signal the generation subsystem to pause. Once buffer space is again available, or medium access is available, the transmission subsystem will signal the generation subsystem to resume.

Access to a shared transport medium is typically governed by a Medium Access Controller (MAC). In many multiplexed transmission systems, including downstream flow toward Passive Optical Network (PON) Optical Network Units (ONUs) or toward wireless User Equipment (UE), the MAC has full visibility of traffic offered from a variety of different sources. The MAC selects a packet for transmission from one of a plurality of queues according to criteria provisioned in the MAC.

Upstream access in PON and wireless networks is typically controlled using an alternative mechanism, according to which the offered traffic is not directly visible to the MAC. The MAC grants access to one of a plurality of contending traffic sources based on one or more criteria. The simplest algorithm is a periodic grant of equal size to each of the contending traffic sources. This algorithm is appropriate for certain kinds of traffic, including for example voice traffic, which is characterized by low, known bandwidth and intolerance to delay variations. It will be appreciated, however, that it would be unsatisfactory to use such an algorithm for the entirety of the capacity of a transmission link. Sources that had no traffic at a particular instant would waste their grant allocations, while sources with large bursts of traffic would be throttled by the limited size of their grants and be unable to take advantage of the capacity not being used by temporarily idle sources. Consequently, MAC grant algorithms are typically augmented by polling the traffic sources, and granting access to the traffic medium on the basis of poll results. A poll result may be as simple as an indication that traffic is queued at the traffic source, waiting to be transmitted, or as complex as a set of priorities and the amount of traffic queued at each priority. A poll need not be a distinct transaction; a poll report may be transmitted as a piggybacked part of a traffic transmission.

On receipt of a set of poll results from its various traffic sources, or clients, a MAC is in a position to allocate transmission capacity more efficiently, taking into account relative priorities and backlog to the extent that such information is available. Allocations of transmission capacity are called grants, and represent permission for a particular traffic source to use the medium, typically at some particular instant for a particular amount of traffic, and possibly for distinct traffic priority classes. It will be appreciated that grant computation naturally falls into a pipeline model, during the first phase of which information about traffic demands are accumulated. During the second phase of grant computation a map of subsequent allocations is computed, referred to as a grant map. During the third phase of grant computation the grant map is executed. Each phase is executed in consecutive time periods, with phases in real world systems typically consuming between 1 and 10 ms.

While improving on the simplest periodic grant algorithms, poll result based algorithms are still naturally executed on a periodic basis, using poll results obtained during a prior period, and generating resulting grants for use during the subsequent period. There is thus an intrinsic delay related to the grant mechanism itself, and traffic may continue to arrive at a traffic source between the sending of its poll result and the receipt of a grant. To some extent, grant delay may be mitigated with small continuing background grants to all traffic sources, but peak or bursty traffic must still want for a larger grant. A traffic source must therefore be able to queue enough traffic to avoid packet loss in the presence of normal congestion and grant delay. The additional memory requirement to support this buffering increases the cost, physical size and power consumption of the traffic source.

In many practical network scenarios, it may be unavoidable or advantageous to deploy configurations that directly or indirectly connect in series two or more transmission media, access to each of which is shared according to poll based grant algorithms as described above. In existing arrangements, each combination of MAC apparatus and its plurality of traffic sources operates independently from other such combinations with which they may be connected. This situation is illustrated in FIG. 1, which shows a network scenario 2 including a first such combination, labelled as MAC domain 1, and a second such combination, labelled as MAC domain 2. The traffic of interest in the figures flows from right to left, from the host, through MAC domain 1 to MAC domain 2. As described above, traffic originating in a subtending host is queued at its medium 1 client 4. MAC 1 polls for queued traffic across its subtending medium 1 clients 4, 6, 8 etc, and in the course of its normal operation, grants permission for the particular medium 1 client 4 to transmit part or all of its backlog. This traffic, along with other traffic received according to grants to other medium 1 clients 6, 8 etc, is forwarded from MAC 1 to a medium 2 client 10 where it is queued. The above process is then repeated in MAC 2, which polls its medium 2 clients 10, 12, 14 etc and grants permission to transmit on medium 2.

Each MAC domain illustrated in FIG. 1 operates independently, meaning that one MAC may be passing traffic from a particular host, while the other MAC is blocking such traffic because it is passing traffic from another source. If the transmission system (MAC domain) adjacent the originating system for the traffic is blocking at a given moment, and the next (or any) transmission system in series between the originating system and the termination point is passing traffic, no traffic will flow, as the first transmission segment has no data to couple to the second transmission segment, assuming there is no buffered data at the second system. If the transmission system (MAC domain) adjacent the originating system for the traffic is passing at a given moment, and a transmission system in series between the originating system and the termination point is blocking traffic, any traffic that does flow must stop and be buffered between transmission segments, and/or the system originating the data must be signalled to suspend transmissions.

Independent operation of series connected MAC domains can thus result in excessive and inconsistent impairments to traffic, including jitter, latency and dropped packets, which in turn cause a reduction in performance and quality of service experienced by the end user. In addition, requirements for increased buffer size within various segments and/or transit points between data source and destination of the data increase cost and complexity of the components. In some situations, buffer requirements may be greater than can be supported by the physical resources available, causing significant impact to overall transmission performance and network product viability.

SUMMARY

It is an aim of the present invention to provide a method, apparatus and computer readable medium which at least partially address one or more of the challenges discussed above.

According to a first aspect of the present invention, there is provided a method for management of traffic in a communication network comprising a first transport medium and a second transport medium connected in series with the first transport medium, access to the first transport medium controlled by a first Medium Access Controller (MAC) and access to the second transport medium controlled by a second MAC, wherein a traffic client of the second MAC receives traffic on the first transport medium for forwarding to the second transport medium. The method comprises receiving from the first MAC information about traffic demands from traffic clients of the first MAC and using the received information, together with information about traffic demands from traffic clients of the second MAC, as input to making a medium access grant decision for the second MAC. The medium access grant decision for the second MAC implements a coordination between traffic access to the first and second transport media. The method further comprises instructing implementation of the medium access grant decision for the second MAC.

According to examples of the invention, the first and second transport media may be connected in series in a direct or indirect manner.

According to examples of the invention, the method may be performed in at least one of the second MAC and/or a Media Access Orchestrator (MAO).

According to examples of the invention, if the method is performed in the second MAC, instructing implementation of the medium access grant decision for the second MAC may comprise the second MAC instructing its internal processors and/or functional units to implement the medium access grant decision. If the method is performed in a MAO, instructing implementation of the medium access grant decision for the second MAC may comprise downloading the medium access grant decision for the second MAC to the second MAC for implementation. If performed in the MAO, the method may further comprise receiving the information about traffic demands from traffic clients of the second MAC. If the method is performed in the second MAC, this information may already be available at the second MAC.

According to examples of the invention, the MAO may be implemented in a Software Defined Networking (SDN) control plane of a communication network According to examples of the invention, the first transport medium may be more peripheral in the communication network than the second transport medium. The traffic flow from the first transport medium towards the second transport medium may thus represent an uplink direction in the communication network.

According to examples of the invention, the method may further comprise using the received information, and the information about traffic demands from traffic clients of the second MAC, as input to making a guidance instruction for a medium access grant decision for the first MAC, wherein the medium access grant decision for the second MAC and the guidance instruction for a medium access grant decision for the first MAC together implement the coordination between traffic access to the first and second transport media. The method may also comprise transmitting the guidance instruction to the first MAC According to examples of the invention, the guidance instruction may comprise at least one of a medium access grant decision for the first MAC, a modification to a medium access grant decision made in the first MAC for the first MAC and/or a modification to a timing value used in the first MAC. In examples of the invention, if control is exerted over the first MAC, a level of this control may thus range from making a replacement grant decision for the first MAC, which overrides a grant decision which may have been made locally in the first MAC, to adjusting a locally made decision, to making no change (for example if the modification leaves the locally made decision unchanged).

According to examples of the invention, the information about traffic demands from traffic clients of the first MAC may comprise results of a poll conducted by the first MAC of traffic clients of the first MAC.

According to examples of the invention, the information about traffic demands from traffic clients of the first MAC may comprise a summarised account of results of a poll conducted by the first MAC of traffic clients of the first MAC.

According to examples of the invention, the information about traffic demands from traffic clients of the first MAC may comprise a medium access grant decision made by the first MAC for the first MAC.

According to examples of the invention, the coordination between access to the first and second transport media may comprise minimising at least one of a buffering time for traffic transiting from the first to the second transport medium and/or an amount of traffic buffered between the first and second transport media.

According to examples of the invention, the coordination between access to the first and second transport media may comprise synchronisation of medium access grants implemented by the first and second MACs. In examples of the invention, the synchronisation may for example concern a single chunk of traffic traversing the first and second transport media.

According to examples of the invention, the communication network may further comprise a plurality of first transport media, access to each first transport medium controlled by a dedicated first MAC, the second MAC being associated with a plurality of traffic clients, individual traffic clients of the second MAC receiving traffic on different first transport media for forwarding to the second transport medium. According to such examples, the method may further comprise receiving information about traffic demands from traffic clients of at least some of the plurality of first MACs, and using the received information, together with information about traffic demands from traffic clients of the second MAC, as input to making the medium access grant decision for the second MAC. The medium access grant decision for the second MAC may implement a coordination between traffic access to the plurality of first transport media and traffic access to the second transport medium.

According to examples of the invention, the method may further comprise using the received information about traffic demands from traffic clients of at least some of the plurality of first MACs, and the information about traffic demands from traffic clients of the second MAC, as input to making guidance instructions for medium access grant decisions for at least some of the plurality of first MACs, wherein the medium access grant decision for the second MAC and the guidance instructions for medium access grant decisions for the first MACs together implement the coordination between traffic access to the plurality of first transport media and the second transport medium. The method may further comprise transmitting the guidance instructions to at least some of the plurality of first MACs.

According to examples of the invention, the communication network may further comprise a third transport medium, access to which is controlled by a third MAC, and the method may further comprise receiving information about traffic demands from traffic clients of the third MAC and using the received information, together with the received information from the first MAC and the information about traffic demands from traffic clients of the second MAC, as input to making the medium access grant decision for the second MAC. The medium access grant decision for the second MAC may implement a coordination between traffic access to the first, second and third transport media.

According to examples of the invention, the method may further comprise using the received information about traffic clients of the third MAC, the received information from the first MAC and the information about traffic demands from traffic clients of the second MAC, as input to making a guidance instruction for a medium access grant decision for the third MAC, wherein the medium access grant decision for the second MAC, the guidance instruction for a medium access grant decision for the first MAC and the guidance instruction for a medium access grant decision for the third MAC together implement the coordination between traffic access to the first, second and third transport media. The method may further comprise transmitting the guidance instruction to the third MAC.

According to examples of the invention, the third transport medium may be connected in series with the first and second transport media, and a traffic client of the first MAC may receive traffic on the third transport medium for forwarding to the first transport medium.

According to another aspect of the present invention, there is provided a method for management of traffic in a communication network comprising a first transport medium and a second transport medium connected in series with the first transport medium, access to the first transport medium controlled by a first Medium Access Controller (MAC), and access to the second transport medium controlled by a second MAC, wherein a traffic client of the second MAC receives traffic on the first transport medium for forwarding to the second transport medium. The method is performed in the first MAC and comprises sending to another network entity information about traffic demands from traffic clients of the first MAC.

According to examples of the invention, the method may further comprise implementing a medium access grant decision for the first MAC. In further examples, the method may also comprise making a medium access grant decision for implementation in the first MAC.

According to examples of the invention, the network entity may comprise at least one of the second MAC and/or a Media Access Orchestrator, MAO.

According to examples of the invention, the MAO may be implemented in a Software Defined Networking (SDN) control plane of a communication network According to examples of the invention, the first transport medium may be more peripheral in the communication network than the second transport medium.

According to examples of the invention, the method may further comprise receiving from the network entity a guidance instruction for a medium access grant decision for the first MAC, wherein the guidance instruction for the medium access grant decision for the first MAC implements, together with a medium access grant decision made in the network entity for the second MAC, a coordination between traffic access to the first and second transport media, and implementing the received guidance instruction.

According to examples of the invention, the guidance instruction may comprise at least one of a medium access grant decision for the first MAC, a modification to a medium access grant decision for the first MAC which has been made in the first MAC and/or a modification to a timing value used in the first MAC.

According to examples of the invention, the information about traffic demands from traffic clients of the first MAC may comprise results of a poll conducted by the first MAC of traffic clients of the first MAC.

According to examples of the invention, the method may further comprise preparing a summarised account of the results of a poll conducted by the first MAC of traffic clients of the first MAC, and the information about traffic demands from traffic clients of the first MAC may comprise the summarised account.

According to examples of the invention, the method may further comprise making a medium access grant decision for the first medium, and the information about traffic demands from traffic clients of the first MAC may comprise the medium access grant decision made by the first MAC.

According to examples of the invention, the coordination between access to the first and second transport media may comprise minimising at least one of a buffering time for traffic transiting from the first to the second transport medium and/or an amount of traffic buffered between the first and second transport media.

According to examples of the invention, the coordination between access to the first and second transport media may comprise synchronisation of medium access grants implemented by the first and second MACs.

According to another aspect of the present invention, there is provided a computer program configured, when run on a computer, to carry out a method according to any one of the preceding aspects of the present invention.

According to another aspect of the present invention, there is provided a computer program product comprising computer readable media having stored thereon a computer program according to the preceding aspect of the present invention.

According to another aspect of the present invention, there is provided a network entity for management of traffic in a communication network comprising a first transport medium and a second transport medium connected in series with the first transport medium, access to the first transport medium controlled by a first Medium Access Controller (MAC) and access to the second transport medium controlled by a second MAC, wherein a traffic client of the second MAC receives traffic on the first transport medium for forwarding to the second transport medium. The network entity comprises a processor and a memory, the memory containing instructions executable by the processor such that the network entity is operative to receive from the first MAC information about traffic demands from traffic clients of the first MAC, and use the received information, together with information about traffic demands from traffic clients of the second MAC, as input to making a medium access grant decision for the second MAC. The medium access grant decision for the second MAC implements a coordination between traffic access to the first and second transport media. The network entity is also operative to instruct implementation of the medium access grant decision for the second MAC.

The network entity may comprise at least one of the second MAC and/or a Media Access Orchestrator (MAO).

According to examples of the present invention, the network entity may be further operable to use the received information, and the information about traffic demands from traffic clients of the second MAC, as input to making a guidance instruction for a medium access grant decision for the first MAC, wherein the medium access grant decision for the second MAC and the guidance instruction for a medium access grant decision for the first MAC together implement the coordination between traffic access to the first and second transport media; and to transmit the guidance instruction to the first MAC.

According to another aspect of the present invention, there is provided a Medium Access Controller (MAC) for management of traffic in a communication network comprising a first transport medium and a second transport medium connected in series with the first transport medium, access to the first transport medium controlled by the Medium Access Controller, MAC, and access to the second transport medium controlled by a second MAC, wherein a traffic client of the second MAC receives traffic on the first transport medium for forwarding to the second transport medium. The MAC comprises a processor and a memory, the memory containing instructions executable by the processor such that the MAC is operable to send to another network entity information about traffic demands from traffic clients of the MAC.

According to examples of the invention, the MAC may be further operable to receive from the network entity a guidance instruction for a medium access grant decision for the MAC, wherein the guidance instruction for the medium access grant decision for the MAC implements, together with a medium access grant decision made in the network entity for the second MAC, a coordination between traffic access to the first and second transport media. The MAC may be further operable to implement the received guidance instruction.

According to another aspect of the present invention, there is provided a system for management of traffic in a communication network comprising a first transport medium and a second transport medium connected in series with the first transport medium, access to the first transport medium controlled by a first Medium Access Controller (MAC) and access to the second transport medium controlled by a second MAC, wherein a traffic client of the second MAC receives traffic on the first transport medium for forwarding to the second transport medium. The system comprises a network entity and the first MAC, wherein the first MAC is configured to send to the network entity information about traffic demands from traffic clients of the MAC, and wherein the network entity is configured to use the received information, together with information about traffic demands from traffic clients of the second MAC, as input to making a medium access grant decision for the second MAC. The medium access grant decision for the second MAC implements a coordination between traffic access to the first and second transport media. The network entity is also configured to instruct implementation of the medium access grant decision for the second MAC.

According to examples of the invention, the network entity may be further configured to use the received information, and the information about traffic demands from traffic clients of the second MAC, as input to making a guidance instruction for a medium access grant decision for the first MAC, wherein the medium access grant decision for the second MAC and the guidance instruction for the medium access grant decision for the first MAC together implement the coordination between traffic access to the first and second transport media; and to transmit the guidance instruction to the first MAC. The first MAC may be configured to implement the received guidance instruction.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
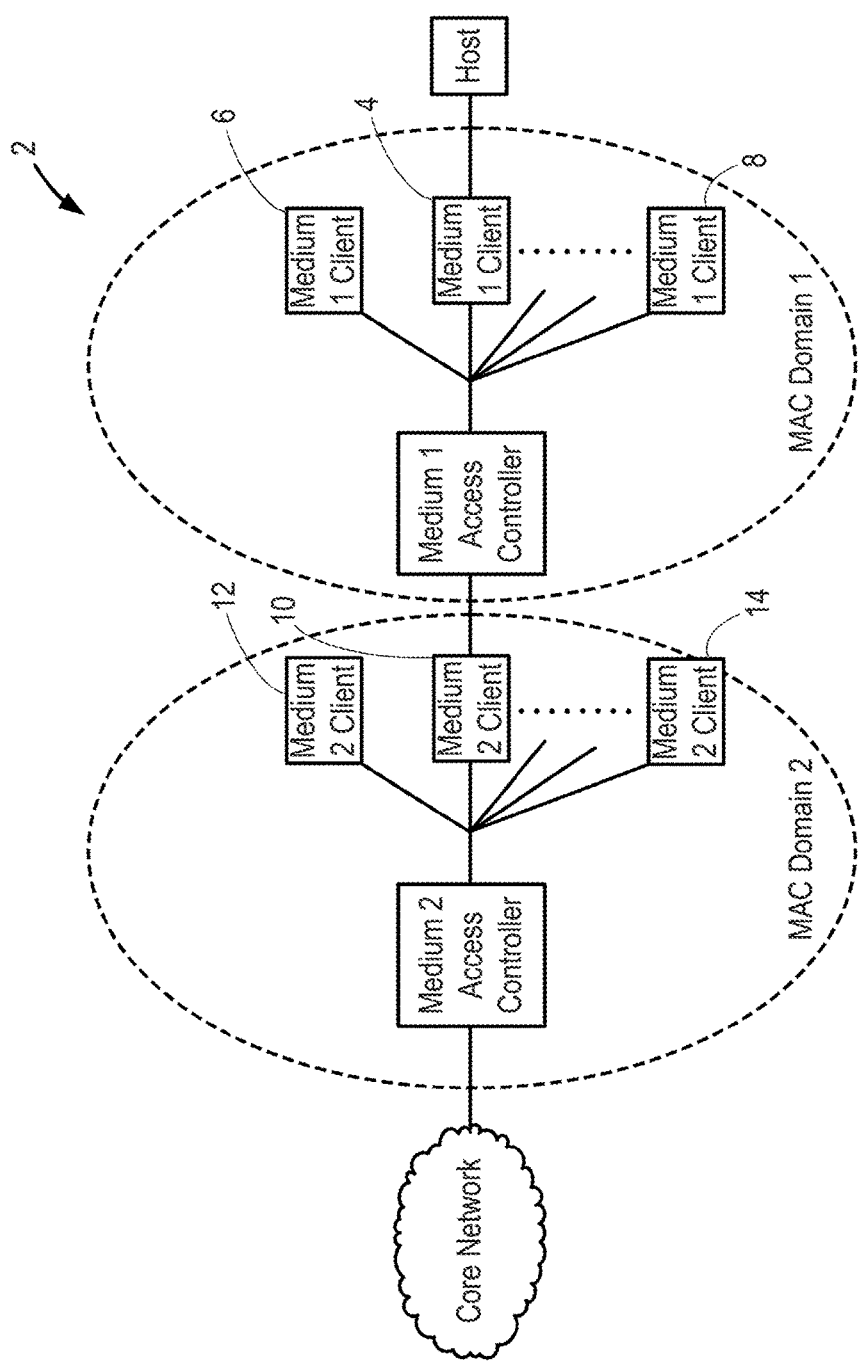
FIG. 1 illustrates a network scenario comprising two independent MAC domains.

In a network scenario according to examples of the present invention, in each domain of a heterogeneous transport network, at least one traffic client contends for capacity on a transport medium, and, in a majority of practical scenarios, a plurality of traffic clients contend for capacity on the transport medium. A centralised MAC controls access to the transport medium, receiving information from the at least one, or from at least some of the plurality, of traffic clients about their traffic demands, and granting transmission capacity on the transport medium to the various traffic clients. Each traffic client may manage one or more queues of data waiting to be transmitted on the relevant transport medium. A traffic client may have a dedicated buffer for each queue, the buffer comprising the contents of the queue, or a single buffer may contain all of the traffic in all of the queues of a single traffic client. An access grant made by a MAC for its transport medium authorises a traffic client of the MAC to transmit a certain amount of traffic on the transport medium. The access grant may specify that it only applies to traffic from the authorised client having a certain priority, or any one of a range of certain priorities. On receipt of an access grant, a traffic client transmits all or part of the contents of its buffers according to its own priorities or as allowed by the priorities specified in the access grant. For the sake of clarity, the following description refers to the making and implementing of individual grant decisions. However, it will be appreciated that in a majority of practical implementations, a plurality of grant decisions is assembled into a grant map, with individual grant decisions being fitted in to a computed or recomputed grant map. The individual grant decisions referred to in the above and following description may therefore be associated with other grant decisions in the construction of grant maps. Each grant decision forming a part of a grant map may be made and/or adjusted according to examples of the present invention.

Examples of the present invention provide methods according to which a degree of coordination is achieved between traffic access to first and second transport media connected in series. This coordination is achieved via a reporting process in which a network entity receives not only traffic demand information from traffic clients of a second MAC, which controls access to a second transport medium, but also information about traffic demands from clients of a first MAC, which first MAC controls access to a first transport medium over which traffic will be forwarded to one of the traffic clients of the second MAC. The network entity then prepares a medium access grant decision for the second MAC, and may in some examples also prepare a guidance instruction for a medium access grant decision for the first MAC. With visibility not only of the traffic demand for clients of the second MAC, but also of traffic waiting at the first MAC to be transmitted to a traffic client of the second MAC, the network entity can ensure a coordination between access to the first and second traffic media, and so may be able to reduce at least one of a buffering time for traffic transmitting from the first to the second transport medium and/or an amount of traffic buffered between the first and second transport media. The network entity may in some cases be the second MAC or may be a separate orchestrating element, which may for example be realised in a control plane of an SDN architecture.

It will be appreciated that the level of coordination achieved between traffic access to first and second transport media according to examples of the invention may vary, according for example to the nature of the information received by the network entity regarding traffic demands from clients the first MAC, and to whether and to what extent the network entity may influence or control medium access grants made by the first MAC. For example, if the network entity receives only limited information concerning traffic demands of clients of the first MAC, including a summary of poll results, or detailed poll results, without influence over the making of grant decisions for the first MAC, the network entity may not be in a position to know precisely how the first MAC will construct its map of grant decisions to process those demands. However, with the knowledge of what traffic is waiting to be transmitted via the first transport medium, the network entity can prepare for a worst case scenario. In this manner, the network entity may effectively implement a one way coordination at the second MAC, in which the network entity makes a medium access grant decision for the second MAC which accounts for a worst case scenario handling by the first MAC of its traffic demands. This one way coordination may for example involve a degree of over-provisioning, as is implemented in other aspects of network traffic management.

A greater level of coordination may be achieved if, for example, the network entity receives details of medium access grant decisions made in the first MAC for the first MAC. One or more medium access grant decisions may be received by the network entity in the form of a grant map for the first MAC. In such examples, the network entity is provided with detailed information about how traffic will arrive over the first transport medium, and the medium access grant decision for the second MAC may therefore implement a greater level of coordination between traffic access to the first and second transport media than was possible when only poll data was received.

A still greater level of coordination may be achieved through the network entity sending a guidance instruction for a medium access grant decision to the first MAC, in addition to making a medium access grant decision for the second MAC. In this manner, the network entity may exert a degree of control over the grant decision implemented in the first MAC, in addition to that implemented in the second MAC. This may include timing and/or duration control, and may also include control over which traffic client is granted access. In this manner, a more precise, two way coordination may be achieved. The different levels of coordination which may be achieved are illustrated below, with reference to FIGS. 2 to 4.

Figure 2:
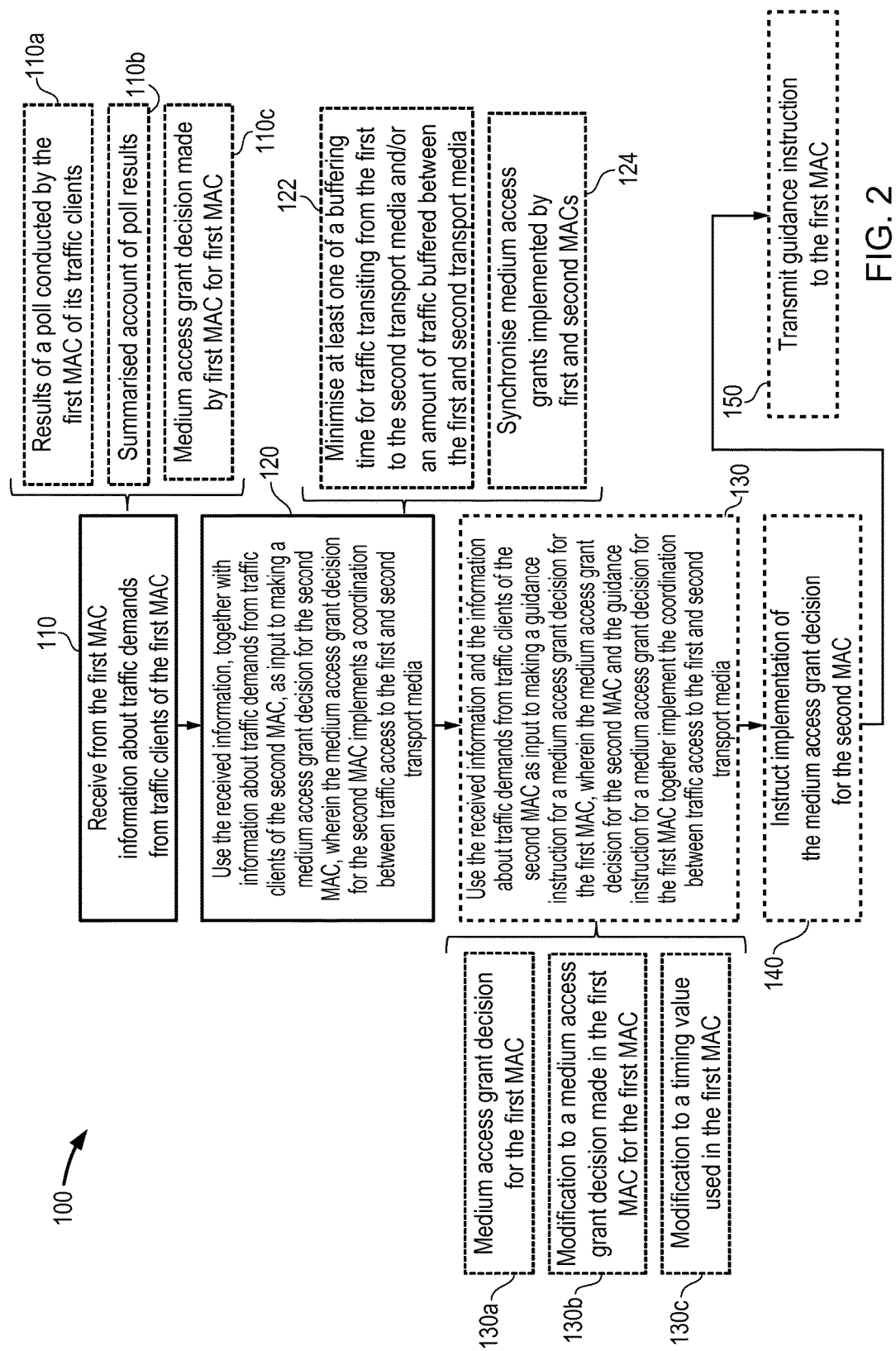
FIG. 2 is a flow chart illustrating process steps in a method for managing traffic in a communication network.

FIG. 2 illustrates process steps in a first example method for managing traffic in a communication network according to an aspect of the present invention. The communication network comprises a first transport medium and a second transport medium connected in series with the first transport medium, access to the first transport medium being controlled by a first MAC, and access to the second transport medium controlled by a second MAC. A traffic client of the second MAC receives traffic on the first transport medium for forwarding to the second transport medium. The traffic flow is thus from the first transport medium towards the second transport medium. In some examples, the first transport medium may be more peripheral in the communication network than the second transport medium, such that the traffic flow is in an uplink direction of the communication network. The method of FIG. 2 is carried out in a network entity, which may be the second MAC or may be a separate orchestration element, as discussed in further detail below.

Referring to FIG. 2, in a first step 110, the network entity receives from the first MAC information about traffic demands from traffic clients of the first MAC. This information may take different forms, as shown in FIG. 2. The information may comprise the results of a poll conducted by the first MAC of its clients, as shown in step 110a, or may comprise a summarised account of the poll results, as shown in step 110*b*. In a further alternative, the information may comprise a medium access grant decision made locally by the first MAC for access to the first transport medium, as shown in step 110*c*. Different levels of information received by the network entity about traffic demands from clients of the first MAC may enable differing levels of coordination and synchronisation to be achieved between access to the first and second transport media. This is discussed in further detail below.

If the method is performed in a separate orchestration element, the orchestration element may also receive information about traffic demands from traffic clients of the second MAC. If the method is performed in the second MAC, then this information will already be available at the second MAC as a consequence of the normal polling procedure carried out in the second MAC.

In a second step 120, the network entity uses the information received from the first MAC, together with information about traffic demands from traffic clients of the second MAC (received or already available as discussed above), as input to making a medium access grant decision for the second MAC. As a consequence of the information concerning traffic demands on both MACs, the network entity has advance notice of traffic that will be arriving over the first transport medium, even if the network entity may not have detailed information as to how access to the first transport medium will be granted to the waiting traffic, for example if the information received includes poll data or a summary of poll data. The grant decision for the second MAC is therefore able to take account of this waiting data traffic, and implement a coordination between traffic access to the first and second transport media.

In some examples of the invention, the network entity may in step 130, use the received information, and the information about traffic demands from traffic clients of the second MAC, as input to making a guidance instruction for a medium access grant decision for the first MAC, in addition to the medium access grant decision made for the second MAC in step 120. In such examples, the medium access grant decision for the second MAC and the guidance instruction for a medium access grant decision for the first MAC together implement the coordination between traffic access to the first and second transport media. The guidance instruction for the first MAC may take the form of a full medium access grant decision for the first MAC, as shown in step 130*a*. This may for example override any grant decision already made in the first MAC or may be provided in response to the results or summary of poll data from the first MAC, with the first MAC waiting to receive the medium access grant decision which it should implement. Alternatively, the guidance instruction for the first MAC may take the form of a modification to a medium access grant decision made locally in the first MAC for the first transport medium as shown in step 130*b*, which decision may be provided to the network entity as the information about traffic demand from its clients. The modification may adjust the timing or size of the medium access grant, and/or may change the traffic client to which the grant is made. Adjusting the medium access grant in this way may ensure a better throughput of data over the first and second transport media, avoiding excessive buffering which may result in packet loss. In some examples, the modification may leave the medium access grant made locally in the first MAC substantially unchanged, for example if the locally made medium access grant decision happens to coordinate with a medium access grant decision made for the second MAC.

In another alternative, shown in step 130*c*, the guidance instruction to the first MAC may comprise a modification to a timing value used in the first MAC. For example, if each MAC operates using time intervals of X ms, it may be desirable to establish a common time domain across both MACs, such that time intervals commence and end at the same time. It may also be desirable to negotiate occasional time delay offsets relative to a common time domain, for example to allow for transmission delay or other local needs or optimisations. Thus the alignment of grant computation and implementation cycles in the two MACs may not require each cycle to start and end at the same time, or to last for a common time duration. Coordinated access to the first and second transport media for a chunk of traffic may on the contrary be achieved by skewing the timing intervals used in the two MACs to allow for local variations, ensuring only that the effect of the medium access grant decisions implemented at each MAC is to minimise delay time during transmission over the two transport media, and/or to minimise the amount of data buffered between the two transport media. The adjustment to a timing interval may apply to a single grant decision, for example applying to traffic from a single host, port or other origin, or may apply to multiple grant decisions. In some examples, timing interval adjustments may be negotiated on a static basis according to a particular situation. In other examples, they may be negotiated on a dynamic basis according to network traffic at a particular instant in time.

As discussed above, the coordination between access to the first and second transport media may achieve a minimising of at least one of a buffering time for traffic transiting from the first to the second transport medium and/or an amount of traffic buffered between the first and second transport media, as shown in step 122. In some examples of the invention, the coordination may achieve synchronisation of medium access grants implemented by the first and second MACs, as shown in step 124. In some examples the synchronised grants may concern a single chunk of data. The degree of synchronisation may be partial or total. Thus, in a perfectly synchronized arrangement, in which for example the first MAC reports detailed information about traffic queued by each of its first medium clients, it may be possible to synchronise the grants of access for a chunk of traffic to the first and second transport media such that essentially no buffering is required in the second medium transport client. In a partially synchronised arrangement, in which for example the first MAC reports only a summary of its traffic demand, the medium access grant decision for the second MAC may add one cycle of delay to its implementation, so giving the first MAC enough time to collect traffic from all of its clients and have the traffic properly queued in the second medium client, ready to respond to the grant from the second MAC. Even with this extra cycle of delay, performance may be improved when compared with independent operation, owing to the avoidance of additional buffering between the two transport media. Either partial or total synchronisation may be achieved with or without the network entity exerting control over the medium access grant decision implemented in the first MAC via a guidance instruction.

Having used the information received from the first MAC, together with information about traffic demands from traffic clients of the second MAC, as input to making the medium access grant decision for the second MAC, and in some examples the guidance instruction for a medium access grant decision for the first MAC, the network entity then instructs implementation of the medium access grant decision for the second MAC in step 140. If the network entity is the second MAC, then instructing implementation of the medium access grant decision for the second MAC in step 140 may comprise the second MAC instructing its internal processors and/or functional units to implement the medium access grant decision. If the network entity is a separate Media Access Orchestrator, then instructing implementation of the medium access grant decision for the second MAC may comprise downloading the medium access grant decision for the second MAC to the second MAC for implementation. If the network entity has also made a guidance instruction for a medium access grant decision for the first MAC, this guidance instruction may be transmitted to the first MAC by the network entity in step 150.

It will be appreciated that although the method 100 refers only to a single first transport medium, the communication network may comprise a plurality of first transport media in a branched arrangement, access to each first transport medium controlled by a dedicated first MAC. The second MAC may be associated with a plurality of traffic clients, individual traffic clients of the second MAC receiving traffic on different first transport media for forwarding to the second transport medium. In such examples, the network entity may receive, at step 110, information about traffic demands from traffic clients of at least some of the plurality of first MACs, which information may be used in step 120 as input in the making of the grant decision for the second MAC, and in step 130, if performed, as input to making guidance instructions for medium access grant decisions for at least some of the plurality of first MACs. These guidance instructions may then be transmitted to the first MACs in step 150. In this manner, a coordinated grant map for the second MAC and at least some of the plurality of first MACs may be achieved.

In another example, one or more additional transport media may also be connected in series with the first and second transport media. For example a third transport medium may be connected in series with the first transport medium, which in turn is connected in series with the second transport medium, such that traffic flows from the third to the first to the second transport medium. In such examples, the network entity may receive information about traffic demands from traffic clients of a third MAC controlling access to the third transport medium in addition to the information received from the one or more first MACs in step 110. This information may then be used as input, together with the information from the first MAC or MACs and the traffic demands for the second MAC, to make the grant decision for the second MAC. In some examples, this information may also be used, together with the information from the first MAC or MACs and the traffic demands for the second MAC, to make the guidance instructions for the first MAC or MACs and a guidance instruction for the third MAC. The grant decision, and guidance instructions if made, may implement coordination between traffic access to the first, second and third transport media. The guidance decision for the third MAC may be transmitted to the third MAC in step 150.

Examples of third, first and second transport media may for example include a wireless link serving a plurality of host computers in a residential environment, a fibre terminal to a residential ONU, and a GPON access network. Multiple first transport media and a third transport media are discussed in further detail below, with reference to FIG. 4.

Figure 3:
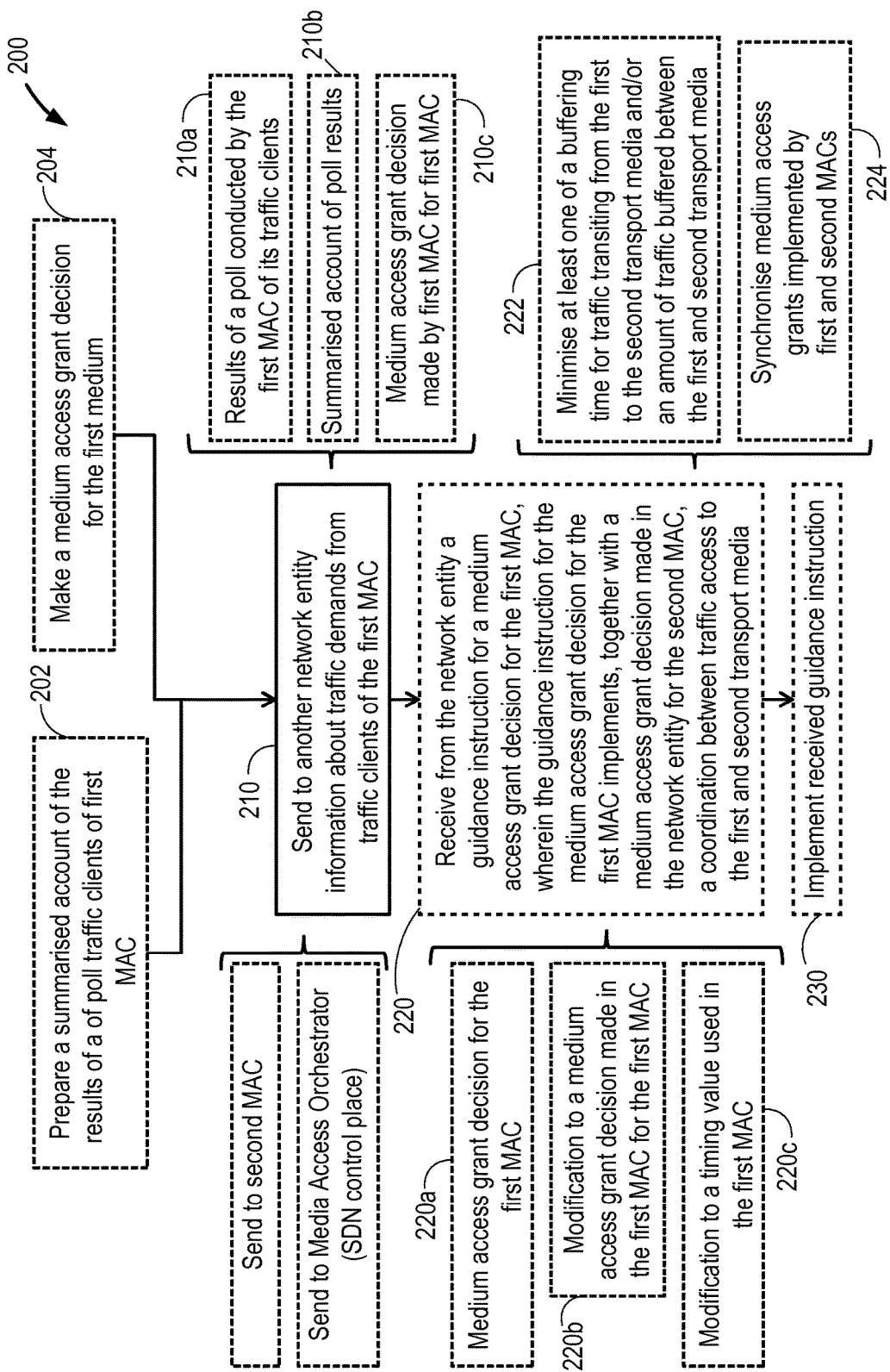
FIG. 3 is a flow chart illustrating another example of a method for managing traffic in a communication network.

FIG. 3 illustrates process steps in another example method for managing traffic in a communication network such as that described above. The method 200 of FIG. 3 is performed in a MAC, and, in the network scenario described above, is performed in the first MAC. The method 200 of FIG. 3 complements the method 100 of FIG. 2, in providing information to a network entity and acting on a received guidance instruction. Referring to FIG. 3, in initial steps 202 or 204, the first MAC may prepare a summarised account of the results of a poll conducted by the first MAC of its traffic clients, or may make a medium access grant decision for access to the first transport medium. In a step 210, the first MAC sends to a network entity information about traffic demands from its traffic clients. As discussed above, this information may take the form of detailed poll results in step 210a, summarised poll results in step 210b, or a medium access grant decision for the first transport medium in step 210c. The nature of the information to be provided by the first MAC to the network entity may dictate whether either of steps 202 and/or 204 is conducted before step 110. The network entity to which the information is sent may be the second MAC or may be a separate Media Access Orchestrator, as discussed above.

After sending information to the network entity in step 210, the first MAC may in some examples proceed with the implementation of a medium access grant decision made in step 204. This may be the case in examples of the invention in which the method 100, conducted in the network entity, does not include the steps 130 and 150 of making and transmitting a guidance instruction to the first MAC. In such examples, after sending the information about traffic demands to the network entity, the first MAC may proceed to implement its locally made access grant decision independently of any other activity conducted by the network entity.

In further examples, the first MAC may receive from the network entity, in step 220, a guidance instruction for a medium access grant decision for the first MAC, wherein the guidance instruction for the medium access grant decision for the first MAC implements, together with a medium access grant decision made in the network entity for the second MAC, a coordination between traffic access to the first and second transport media. The first MAC may then implement the received guidance instruction in step 230.

As discussed above with respect to FIG. 2, the guidance instruction received in step 220 may take the form of a full medium access grant decision for the first MAC, as shown in step 220a. This may for example override any grant decision already made in the first MAC, or may be provided in response to the results or summary of poll data sent by the first MAC, with the first MAC waiting to receive the medium access grant decision which it should implement. Alternatively, the guidance instruction for the first MAC may take the form of a modification to a medium access grant decision made locally in the first MAC for the first transport medium, which decision may be provided to the network entity as the information about traffic demand from its clients in step 210c. The modification may adjust the timing or size of the medium access grant, and/or may change the traffic client to which the grant is made. In another alternative, shown in step 220c, the guidance instruction to the first MAC may comprise a modification to a timing value used in the first MAC. Further discussion of each of these alternatives is provided above with reference to FIG. 2.

Also as discussed above, the coordination between access to the first and second transport media implemented by the guidance instruction for the first MAC and grant decision for the second MAC may achieve a minimising at least one of a buffering time for traffic transiting from the first to the second transport medium and/or an amount of traffic buffered between the first and second transport media, as shown in step 222. In some examples of the invention, the coordination may achieve synchronisation of medium access grants implemented by the first and second MACs, as shown in step 224. As previously, this is discussed in further detail above with reference to FIG. 2.

It will be appreciated that the methods 100, 200 of FIGS. 2 and 3 cooperate to enable improvements in traffic delivery over multiple transport media, access to each transport medium controlled by a dedicated MAC. Examples of the present invention also provide a system for the management of traffic in a communication network, the system comprising a first MAC controlling access to a first transport medium, and a second MAC controlling access to a second transport medium. The system also comprises a network entity, which may be the second MAC or may be a separate Media Access Orchestrator.

Figure 4:
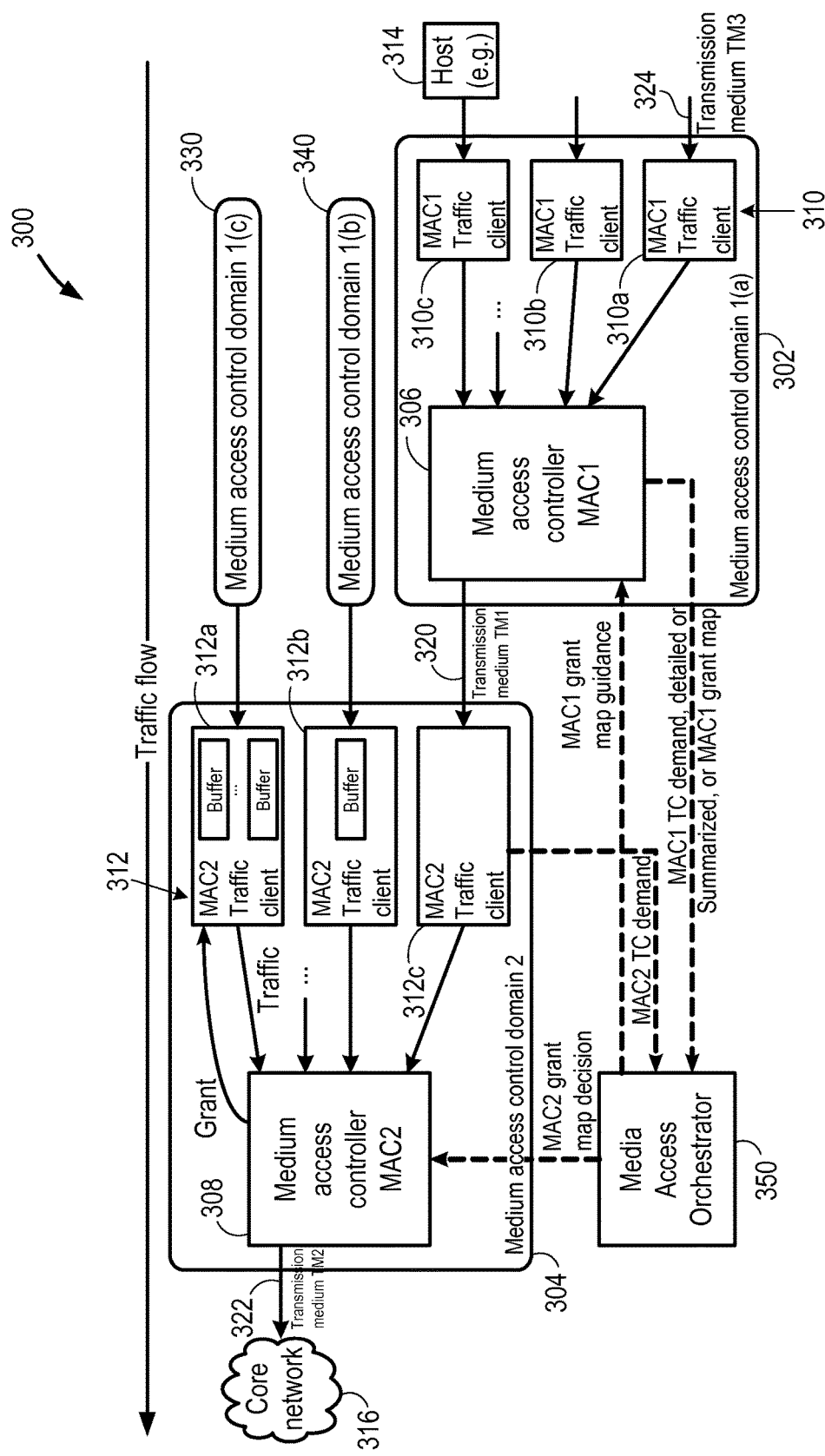
FIG. 4 illustrates a system for management of traffic in a communication network.

FIG. 4 illustrates an example system 300, in which the network entity comprises a separate Media Access Orchestrator 350, within which is housed an algorithm running an example of the method 100 described above. Referring to FIG. 4, the communication network of the system 300 comprises a plurality of first Medium Access Control domains 302, 330, 340 and a second Medium Access Control domain 304. Only one of the plurality of first Medium Access Control domains is illustrated in detail. Each Medium Access Control domain comprises a dedicated MAC 306, 308 and a plurality of traffic clients, each vying for access to the transport medium 320, 322 controlled by the MAC. In the example scenario, traffic flow is from right to left of the Figure. Traffic generating subsystems, including for example Host 314, generate traffic which is forwarded to traffic clients 310a, 310b, 310c in the first Media Access Control domain 302. One or more of the traffic clients may alternatively receive traffic forwarded over a third transport medium 324, as illustrated in the Figure. Each of the traffic clients 310 buffers its data waiting to be granted access to transmit over the first transport medium 320. Traffic transmitted over the first transport medium is received at traffic client 312c of the second MAC in the second Medium Access Control domain 304. Traffic client 312c is one of a plurality of traffic clients 312a, 312b etc of the second MAC 308. Each traffic client may receive traffic forwarded from a different first Medium Access Control domain 302, 330, 340 etc. As illustrated, the traffic clients may include a single buffer for all incoming traffic, or may include multiple buffers, for example each buffer containing traffic having a different assigned priority, quality of service or other parameter. Each of the traffic clients 312a, 312b, 312c of the second MAC 308 vies for access to the second transport medium 322, which enables traffic to be forwarded, in the illustrated example, towards the core network 316.

As mentioned above, in the illustrated example, the network entity of the system 300 is a separate Media Access Orchestrator 350, on which is performed an example of the method 100. An example of the method 200 is performed in the or each of the first MACs 306. Communication between the different entities according to different examples of the system is illustrated in dashed arrows. In accordance with the above described methods, the first MAC 306 sends to the Orchestrator 350 information about traffic demand from its clients. This may be in the form of detailed or summarised poll results of a MAC 1 grant decision, or grant map. The orchestrator also receives, either from the second MAC 308 or from the traffic clients 312 of the second MAC 308, an indication of traffic demand from clients of the second MAC 308. The orchestrator 350 uses this information to make a grant decision for the second MAC 308, and may also use this information to make a guidance instruction for a grant decision for the first MAC 306. The grant decision for the second MAC 308 and, if made, the guidance instruction for the first MAC 306, are then transmitted to the relevant entity for implementation. The grant decision, and guidance instruction if made and transmitted, implement a level of coordination between access to the first and second transport media. Thus access grants by the first and second MACs may be coordinated in both timing and size, such that a particular chunk of traffic may transit through the system with a minimum of buffering between the first and second transport media. The orchestrator 350 may also receive information about traffic demands from clients of additional first MACs in the other first Medium Access Control domains 330 and 340, and information about traffic demands from clients of a third MAC controlling access to the third transport medium 324. The orchestrator may take this information into account in making the grant decision for the second MAC 308, so implementing a level of coordination between access to the third transport medium 324, each of the first transport media and the second transport medium. The network entity may also take this information into account in computing guidance instructions for each of the first and third MACs, enabling a greater degree of coordination between access to the third transport medium 324, each of the first transport media and the second transport medium. The orchestrator 350 may thus have a global view of traffic demands on all traffic segments, or Medium Access Control domains, of the network, as well as the interconnection topology of these segments, and may compute and transmit grant decisions and guidance instructions in such a manner as to coordinate and optimise traffic throughput across the communication network. The guidance instructions may for example comprise medium access grant decisions, such that the orchestrator 350 computes a global grant map for all segments of the network under its control and then downloads the relevant sections of the global grant map to each MAC.

In another embodiment, not illustrated, an example of the method 100 may be implemented in the second MAC 308. According to this example, the second MAC 308 receives advance information of traffic that is not yet directly visible at its clients 312 thanks to the information received from the or each of the first MACs. The second MAC then optimises its own grant strategy as well, in some examples, as guiding the grant strategy of the or each of the first MACs though the issuance of guidance instructions.

Figure 5:
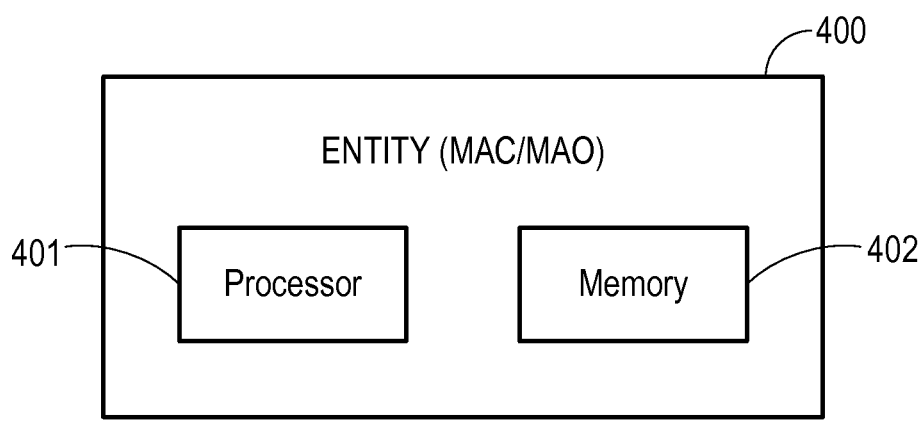
FIG. 5 illustrates functional units in a network entity.

As discussed above, examples of the methods 100, 200 may be conducted in a MAC or in a network entity, which may be a MAC or a media access orchestrator, implemented for example in a control place of an SDN network. The methods may be implemented on receipt of suitable computer readable instructions, which may be embodied within a computer program running on the network entity or MAC. FIG. 5 illustrates a first example of a network entity 400 which may execute examples of the method 100 of the present invention, for example on receipt of suitable instructions from a computer program. Referring to FIG. 5, the network entity 400 comprises a processor 401 and a memory 402. The memory 402 contains instructions executable by the processor 401 such that the network entity 400 is operative to conduct the steps of the method 100 of FIG. 2.

Figure 6:
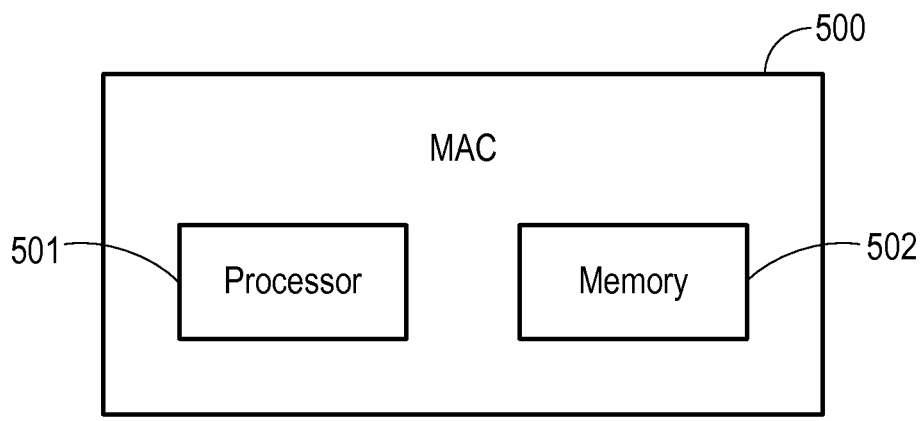
FIG. 6 illustrates functional units in a MAC.

FIG. 6 illustrates a first example of a MAC 500 which may execute examples of the method 200 of the present invention, for example on receipt of suitable instructions from a computer program. Referring to FIG. 6, the MAC 500 comprises a processor 501 and a memory 502. The memory 502 contains instructions executable by the processor 501 such that the MAC 500 is operative to conduct the steps of the method 200 of FIG. 3.

Figure 7:
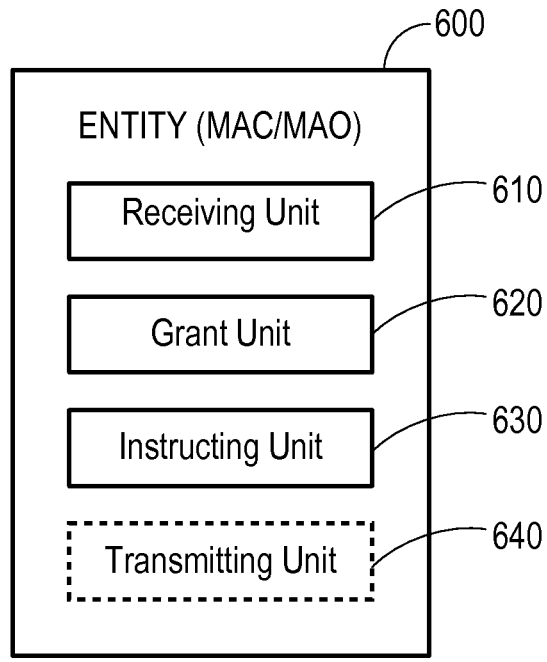
FIG. 7 illustrates functional units in another example of network entity.

FIG. 7 illustrates functional units in another example of network entity 600 which may execute examples of the method 100 of the present invention, for example according to computer readable instructions received from a computer program. The network entity 600 may operate within a communication network comprising first and second transport media as described above. It will be understood that the units illustrated in FIG. 7 are functional units, and may be realised in any appropriate combination of hardware and/or software. The units may comprise one or more processors and may be integrated to any degree.

Referring to FIG. 7, the network entity 600, which may be a MAC or a media access orchestrator, comprises a receiving unit 610 for receiving from the first MAC information about traffic demands from traffic clients of the first MAC. If the network entity is a media access orchestrator, the receiving unit 610 may also be for receiving information about traffic demands from traffic clients of the second MAC. If the network entity is the second MAC, then this information will already be available at the second MAC as a consequence of the normal polling procedure carried out in the second MAC. The network entity also comprises a grant unit 620 for using the received information, together with the information about traffic demands from traffic clients of the second MAC, as input to making a medium access grant decision for the second MAC. The grant unit 620 may also be for making a guidance instruction for a medium access grant decision for the first MAC. The medium access grant decision for the second MAC, and if appropriate the guidance instruction for the medium access grant decision for the first MAC, implement a coordination between traffic access to the first and second transport media. The network entity also comprises an instructing unit 630 for instructing implementation of the medium access grant decision for the second MAC. The network entity may also comprise a transmitting unit 640 for transmitting the guidance instruction to the first MAC.

The receiving unit 610 may be for receiving results of a poll conducted by the first MAC of traffic clients of the first MAC, a summarised account of results of a poll conducted by the first MAC of traffic clients of the upstream first MAC, and/or a medium access grant decision made by the first MAC for the first MAC.

The grant unit 620 may be for making a guidance instruction comprising a medium access grant decision for the first MAC, a modification to a medium access grant decision made in the first MAC for the first MAC and/or a modification to a timing value used in the first MAC.

The grant unit 620 may implement coordination comprising minimising at least one of a buffering time for traffic transiting from the first to the second transport medium and/or an amount of traffic buffered between the first and second transport media. The grant unit 620 may also or alternatively implement coordination comprising synchronisation of medium access grants implemented by the first and second MACs.

The communication network in which the network entity operates may comprise a plurality of first transport media, access to each first transport medium controlled by a dedicated first MAC, the second MAC being associated with a plurality of traffic clients, individual traffic clients of the second MAC receiving traffic on different first transport media for forwarding to the second transport medium. The receiving unit 610 may be for receiving information about traffic demands from traffic clients of at least some of the plurality of first MACs. The grant unit 620 may be for using the received information, together with information about traffic demands from traffic clients of the second MAC, as input to making a medium access grant decision for the second MAC, and in some examples, guidance instructions for medium access grant decisions for at least some of the plurality of first MACs. The medium access grant decision for the second MAC, and if appropriate the guidance instructions for the medium access grant decisions for the first MACs, may implement a coordination between traffic access to the plurality of first transport media and traffic access to the second transport medium. The transmitting unit 640, if present, may be for transmitting the guidance instructions to the at least some of the plurality of first MACs The communication network may further comprise a third transport medium, access to which is controlled by a third MAC. The receiving unit 610 may be for receiving information about traffic demands from traffic clients of the third MAC. The grant unit may be for using the received information, together with the received information from the first MAC and the information about traffic demands from traffic clients of the second MAC, as input to making a medium access grant decision for the second MAC, and in some examples the guidance instruction for a medium access grant decision for the first MAC and a guidance instruction for a medium access grant decision for the third MAC. The medium access grant decision for the second MAC, the guidance instruction for the medium access grant decision for the first MAC and the guidance instruction for the medium access grant decision for the third MAC may implement a coordination between traffic access to the first, second and third transport media. The transmitting unit 640, if present, may additionally be for transmitting the guidance instruction to the third MAC.

Figure 8:
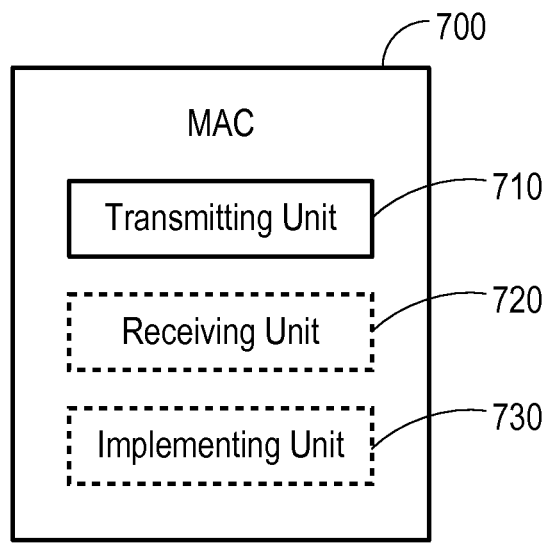
FIG. 8 illustrates functional units in another example of MAC.

FIG. 8 illustrates functional units in another example of MAC 700 which may execute examples of the method 200 of the present invention, for example according to computer readable instructions received from a computer program. The MAC 700 may operate within a communication network comprising first and second transport media as described above, and may control access to the first transport medium. It will be understood that the units illustrated in FIG. 8 are functional units, and may be realised in any appropriate combination of hardware and/or software. The units may comprise one or more processors and may be integrated to any degree.

Referring to FIG. 8, the MAC 700 comprises a transmitting unit 710 for sending to another network entity information about traffic demands from traffic clients of the MAC 700. The MAC 700 may also comprise a receiving unit 720 for receiving from the network entity a guidance instruction for a medium access grant decision for the MAC, wherein the guidance instruction for the medium access grant decision for the MAC implements, together with a medium access grant decision made in the network entity for the second MAC, a coordination between traffic access to the first and second transport media. The MAC 700 may also comprise an implementing unit 730 for implementing the received guidance instruction.

The transmitting unit 710 may be for sending results of a poll conducted by the MAC 700 of traffic clients of the MAC 700.

The MAC 700 may further comprise a summary unit (not shown) for preparing a summarised account of the results of a poll conducted by the MAC of traffic clients of the MAC 700, and the transmitting unit may be for sending the summarised account to the network entity.

The transmitting unit 710 may be for sending a medium access grant decision made by the first MAC.

The receiving unit 720, if present, may be for receiving a guidance instruction in the form of: a medium access grant decision for the MAC 700, a modification to a medium access grant decision for the MAC 700 which has been made in the MAC 700, and/or a modification to a timing value used in the MAC 700.

Aspects of the present invention provide methods enabling coordination of access to different transport media connected in series. The coordination may enable traffic to pass from source to destination, via the different transport media, with reduced latency and reduced pseudo-random interruptions in flow. The jitter and latency associated with buffering between different transport media may thus be reduced or substantially eliminated, in addition to the packet loss associated with running out of buffer memory while waiting for access to the next transmission medium. In addition to improvements in perceived network performance for an end user, aspects of the invention may enable the implementation of networking equipment in physically smaller and lower power packages, owing to the reduced physical resource requirements, notably the reduced memory requirements for buffering between transport media.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Further Embodiments

A. A network entity for management of traffic in a communication network comprising a first transport medium and a second transport medium connected in series with the first transport medium, access to the first transport medium controlled by a first Medium Access Controller, MAC, and access to the second transport medium controlled by a second MAC, wherein a traffic client of the second MAC receives traffic on the first transport medium for forwarding to the second transport medium, the network entity comprising:

a receiving unit for receiving from the first MAC information about traffic demands from traffic clients of the first MAC;

a grant unit for using the received information, together with information about traffic demands from traffic clients of the second MAC, as input to making a medium access grant decision for the second MAC, wherein the medium access grant decision for the second MAC implements a coordination between traffic access to the first and second transport media; and an instructing unit for instructing implementation of the medium access grant decision for the second MAC.

B. A network entity as described in embodiment A, wherein the grant unit is also for using the received information, and the information about traffic demands from traffic clients of the second MAC, as input to making a guidance instruction for a medium access grant decision for the first MAC, wherein the medium access grant decision for the second MAC and the guidance instruction for a medium access grant decision for the first MAC together implement the coordination between traffic access to the first and second transport media; the network entity further comprising:

a transmitting unit for transmitting the guidance instruction to the first MAC.

C. A Medium Access Controller, MAC, for management of traffic in a communication network comprising a first transport medium and a second transport medium connected in series with the first transport medium, access to the first transport medium controlled by the Medium Access Controller, MAC, and access to the second transport medium controlled by a second MAC, wherein a traffic client of the second MAC receives traffic on the first transport medium for forwarding to the second transport medium, the MAC comprising:

a transmitting unit for sending to another network entity information about traffic demands from traffic clients of the MAC.

D. A MAC as described in embodiment C, further comprising:

a receiving unit for receiving from the network entity a guidance instruction for a medium access grant decision for the MAC, wherein the guidance instruction for the medium access grant decision for the MAC implements, together with a medium access grant decision made in the network entity for the second MAC, a coordination between traffic access to the first and second transport media; and an implementing unit for implementing the received guidance instruction.

E. A system for management of traffic in a communication network comprising a first transport medium and a second transport medium connected in series with the first transport medium, access to the first transport medium controlled by a first Medium Access Controller, MAC, and access to the second transport medium controlled by a second MAC, wherein a traffic client of the second MAC receives traffic on the first transport medium for forwarding to the second transport medium, the system comprising a network entity and the first MAC:

wherein the first MAC is configured to send to the network entity information about traffic demands from traffic clients of the MAC;

wherein the network entity is configured to use the received information, together with information about traffic demands from traffic clients of the second MAC, as input to making a medium access grant decision for the second MAC, wherein the medium access grant decision for the second MAC implements a coordination between traffic access to the first and second transport media; and to instruct implementation of the medium access grant decision for the second MAC.

F. A system as described in embodiment E, wherein the network entity is further configured to:

use the received information, and the information about traffic demands from traffic clients of the second MAC, as input to making a guidance instruction for a medium access grant decision for the first MAC, wherein the medium access grant decision for the second MAC and the guidance instruction for the medium access grant decision for the first MAC together implement the coordination between traffic access to the first and second transport media; and to transmit the guidance instruction to the first MAC;

and wherein the first MAC is configured to implement the received guidance instruction.

The invention claimed is:

1. A method for management of traffic in a communication network comprising a first transport medium and a second transport medium connected in series with the first transport medium, access to the first transport medium controlled by a first Medium Access Controller (MAC), and access to the second transport medium controlled by a second MAC, wherein a traffic client of the second MAC receives traffic on the first transport medium for forwarding to the second transport medium, the method comprising:

receiving from the first MAC information about traffic demands from traffic clients of the first MAC;

using the received information, together with information about traffic demands from traffic clients of the second MAC, as input to making a medium access grant decision for the second MAC, wherein the medium access grant decision for the second MAC implements a coordination between traffic access to the first and second transport media; and instructing implementation of the medium access grant decision for the second MAC.

2. The method as claimed in claim 1, wherein the method is performed in at least one of:

the second MAC;

a Media Access Orchestrator (MAO).

3. The method as claimed in claim 2, wherein the MAO is implemented in a Software Defined Networking (SDN) control plane of a communication network.

4. The method as claimed in claim 1, wherein the first transport medium is more peripheral in the communication network than the second transport medium.

5. The method as claimed in claim 1, further comprising:

using the received information, and the information about traffic demands from traffic clients of the second MAC, as input to making a guidance instruction for a medium access grant decision for the first MAC, wherein the medium access grant decision for the second MAC and the guidance instruction for a medium access grant decision for the first MAC together implement the coordination between traffic access to the first and second transport media; and transmitting the guidance instruction to the first MAC.

6. The method as claimed in claim 5, wherein the guidance instruction comprises at least one of:

a medium access grant decision for the first MAC;

a modification to a medium access grant decision made in the first MAC for the first MAC;

a modification to a timing value used in the first MAC.

7. The method as claimed in claim 1, wherein the information about traffic demands from traffic clients of the first MAC comprises results of a poll conducted by the first MAC of traffic clients of the first MAC.

8. The method as claimed in claim 1, wherein the information about traffic demands from traffic clients of the first MAC comprises a summarised account of results of a poll conducted by the first MAC of traffic clients of the first MAC.

9. The method as claimed in claim 1, wherein the information about traffic demands from traffic clients of the first MAC comprises a medium access grant decision made by the first MAC for the first MAC.

10. The method as claimed in claim 1, wherein the coordination between access to the first and second transport media comprises minimising at least one of:

a buffering time for traffic transiting from the first to the second transport medium;

an amount of traffic buffered between the first and second transport media.

11. The method as claimed in claim 1, wherein the coordination between access to the first and second transport media comprises synchronisation of medium access grants implemented by the first and second MACs.

12. The method as claimed in claim 1, wherein the communication network further comprises a plurality of first transport media, access to each first transport medium controlled by a dedicated first MAC, the second MAC being associated with a plurality of traffic clients, individual traffic clients of the second MAC receiving traffic on different first transport media for forwarding to the second transport medium, the method further comprising:

receiving information about traffic demands from traffic clients of at least some of the plurality of first MACs; and using the received information, together with information about traffic demands from traffic clients of the second MAC, as input to making the a medium access grant decision for the second MAC, wherein the medium access grant decision for the second MAC implements a coordination between traffic access to the plurality of first transport media and traffic access to the second transport medium.

13. The method as claimed in claim 1, wherein the communication network further comprises a third transport medium, access to which is controlled by a third MAC, and wherein the method further comprises:

receiving information about traffic demands from traffic clients of the third MAC;

using the received information together with the received information from the first MAC and the information about traffic demands from traffic clients of the second MAC, as input to making the medium access grant decision for the second MAC, wherein the medium access grant decision for the second MAC implements a coordination between traffic access to the first, second and third transport media.

14. A method for management of traffic in a communication network comprising a first transport medium and a second transport medium connected in series with the first transport medium, access to the first transport medium controlled by a first Medium Access Controller (MAC), and access to the second transport medium controlled by a second MAC, wherein a traffic client of the second MAC receives traffic on the first transport medium for forwarding to the second transport medium, the method performed in the first MAC and comprising:

sending to another network entity information about traffic demands from traffic clients of the first MAC;

receiving from the network entity a guidance instruction for a medium access grant decision for the first MAC, wherein the guidance instruction for the medium access grant decision for the first MAC implements, together with a medium access grant decision made in the network entity for the second MAC, a coordination between traffic access to the first and second transport media; and implementing the received guidance instruction.

15. The method as claimed in claim 14, wherein the network entity comprises at least one of:

the second MAC;

a Media Access Orchestrator (MAO).

16. The method as claimed in claim 15, wherein the MAO is implemented in a Software Defined Networking (SDN) control plane of a communication network.

17. The method as claimed in claim 14, wherein the first transport medium is more peripheral in the communication network than the second transport medium.

18. The method as claimed in claim 14, wherein the guidance instruction comprises at least one of:

a medium access grant decision for the first MAC;

a modification to a medium access grant decision for the first MAC which has been made in the first MAC;

a modification to a timing value used in the first MAC.

19. The method as claimed in claim 14, wherein the information about traffic demands from traffic clients of the first MAC comprises results of a poll conducted by the first MAC of traffic clients of the first MAC.

20. The method as claimed in claim 14, further comprising preparing a summarised account of the results of a poll conducted by the first MAC of traffic clients of the first MAC, wherein the information about traffic demands from traffic clients of the first MAC comprises the summarised account.

21. The method as claimed in claim 14, further comprising making a medium access grant decision for the first transport medium, wherein the information about traffic demands from traffic clients of the first MAC comprises the medium access grant decision made by the first MAC.

22. The method as claimed in claim 14, wherein the coordination between access to the first and second transport media comprises minimising at least one of:

a buffering time for traffic transiting from the first to the second transport medium;

an amount of traffic buffered between the first and second transport media.

23. The method as claimed in claim 14, wherein the coordination between access to the first and second transport media comprises synchronisation of medium access grants implemented by the first and second MACs.

24. A network entity for management of traffic in a communication network comprising a first transport medium and a second transport medium connected in series with the first transport medium, access to the first transport medium controlled by a first Medium Access Controller (MAC), and access to the second transport medium controlled by a second MAC, wherein a traffic client of the second MAC receives traffic on the first transport medium for forwarding to the second transport medium, the network entity comprising a processor and a memory, the memory containing instructions executable by the processor such that the network entity is operative to:

receive from the first MAC information about traffic demands from traffic clients of the first MAC;

use the received information, together with information about traffic demands from traffic clients of the second MAC, as input to making a medium access grant decision for the second MAC, wherein the medium access grant decision for the second MAC implements a coordination between traffic access to the first and second transport media; and instruct implementation of the medium access grant decision for the second MAC.

25. The network entity as claimed in claim 24, wherein the network entity comprises at least one of:

the second MAC;

a Media Access Orchestrator (MAO).

26. The network entity as claimed in claim 24, wherein the network entity is further operable to:

use the received information, and the information about traffic demands from traffic clients of the second MAC, as input to making a guidance instruction for a medium access grant decision for the first MAC, wherein the medium access grant decision for the second MAC and the guidance instruction for a medium access grant decision for the first MAC together implement the coordination between traffic access to the first and second transport media; and transmit the guidance instruction to the first MAC.

27. A Medium Access Controller (MAC) for management of traffic in a communication network comprising a first transport medium and a second transport medium connected in series with the first transport medium, access to the first transport medium controlled by the Medium Access Controller (MAC), and access to the second transport medium controlled by a second MAC, wherein a traffic client of the second MAC receives traffic on the first transport medium for forwarding to the second transport medium, the MAC comprising a processor and a memory, the memory containing instructions executable by the processor such that the MAC is operable to:

send to another network entity information about traffic demands from traffic clients of the MAC;

receive from the network entity a guidance instruction for a medium access grant decision for the MAC, wherein the guidance instruction for the medium access grant decision for the MAC implements, together with a medium access grant decision made in the network entity for the second MAC, a coordination between traffic access to the first and second transport media; and implement the received guidance instruction.

* * * * *